May 21, 1957 W. A. MURRAY 2,792,872
METHOD OF MAKING SIDE-DRIVING BELTS
Original Filed March 13, 1951
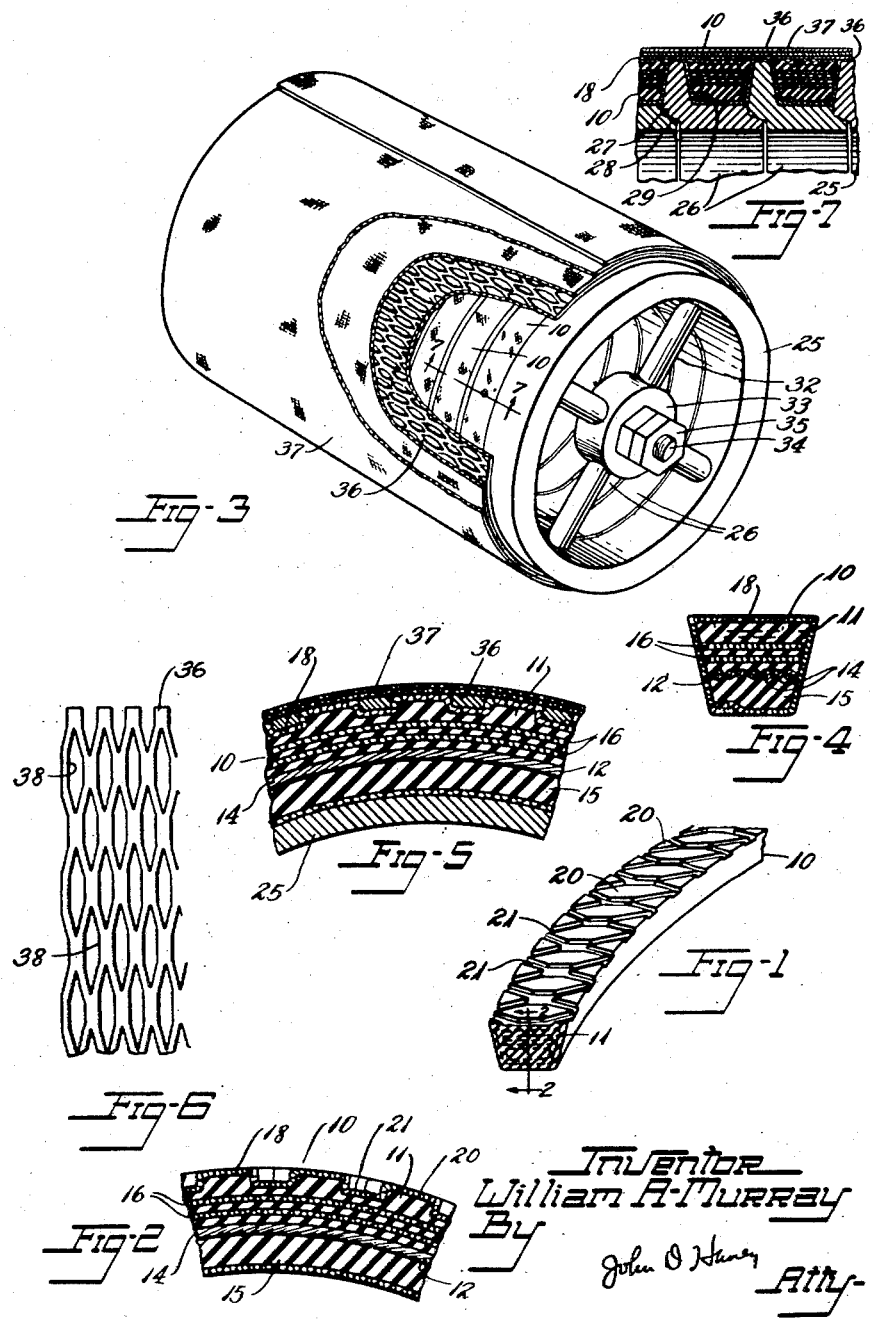

United States Patent Office 2,792,872
Patented May 21, 1957

2,792,872

METHOD OF MAKING SIDE-DRIVING BELTS

William A. Murray, Cuyahoga Falls, Ohio, assignor to The B. F. Goodrich Company, New York, N. Y., a corporation of New York Original application March 13, 1951, Serial No. 215,357, now Patent No. 2,724,278, dated November 22, 1955. Divided and this application September 2, 1955, Serial No. 536,246

2 Claims. (Cl. 154—4)

This invention relates to side-driving belts and is particularly useful in the manufacture of belts of combined rubber-like and textile materials.

In the manufacture of side-driving belts it has been proposed to employ a layer of substantially inextensible tension members such as cords at the neutral bending zone of the belt to sustain the tension load of the belt in use. It has also been proposed to provide a body of stretchable rubber-like material inwardly of the layer of tension material to sustain the laterally applied compression load due to wedging of the belt in the V-groove of the pulley. Usually somewhat stretchable woven fabric material coated with rubber-like material has been applied outwardly of the tension material to complete the tension zone of the belt and in most cases at least one layer of this fabric has been continued in its extent over the side faces of the belt to provide a cover therefor.

In vulcanizing such belts, which have usually been made endless, the assembled material has been placed in a peripheral molding groove of a mold or curing drum and has been contracted in the groove by pressure applied to the periphery of the belt as by a rag wrapping applied thereabout. Such curing methods have sometimes resulted in excessive contraction of the layer of tension members during vulcanization of the belt resulting in excessive stretch of the belts in use.

Furthermore, in use of such belts the fabric covering has sometimes provided insufficient stretch resulting in the assumption of part of the tension load by the cover and providing undue stiffness of the belt, especially when the belt was used about grooved pulleys of small diameter. Such loading of the cover has sometimes caused failure of the cover resulting in progressive failure of the belt.

It is an object of the present invention to overcome the foregoing difficulties by compacting the assembled belt material in a peripheral mold groove and providing high extensibility of the cover at the outer surface of the belt while avoiding excessive contraction of the tension members.

This application is a division of the application of William A. Murray, Serial No. 215,357 filed March 13, 1951, now Patent No. 2,724,278 dated November 22, 1955.

Other objects are to provide increased stretchability of the fabric material at the outer periphery of the belt, to provide for cooling of the belt in use, and to provide increased flexibility of the belt.

These and other objects will appear from the following description and the accompanying drawings.

Of the drawings,

Fig. 1 is a perspective view of a portion of a belt constructed in accordance with and embodying the invention, showing the belt in section, Fig. 2 is a longitudinal sectional view of the belt taken on line 2—2 of Fig. 1 and drawn to larger scale, Fig. 3 is a perspective view of a molding drum with a plurality of belts and pressure wrappings thereon, Fig. 4 in a cross-sectional view of the belt to a larger scale, Fig. 5 is a sectional view of the drum with a belt and the pressure wrappings, the section being taken longitudinally of the belt.

Fig. 6 is a fragmentary plan view of the perforated wrapping sheet.

Fig. 7 is a sectional view taken on line 7—7 of Fig. 3.

Referring to the drawings, and first to Fig. 1, this shows a side driving belt of trapezoidal cross section. The belt 10 comprises a body of rubber-like material 11 and textile material including a layer 12 of tension-resisting elements 14 arranged as a horizontal layer of circumferential cords at or close to the neutral bending axis of the belt. A compression-resisting body 15 of rubber-like material extends below the cords where it resists lateral compression of the belt in use. Several layers 16 of woven fabric placed over the layer of tension-resisting elements 14 provide additional resistance to lateral compression of the belt and are preferably of bias cut fabric of high extensibility circumferentially of the belt to provide circumferential flexibility. A cover 18 of bias cut square-woven fabric extends over the outer peripheral face of the belt and continues downwardly along each inclined side driving face, preferably completely enclosing the body 15 of rubber-like material. All of the structural elements of the belt are coated with rubber-like material to promote adhesion and to reduce internal friction in the finished belt. At the outer peripheral face of the belt, the cover 18 and its coating of rubber-like material are formed to provide a succession of outwardly projecting protuberances 20 separated by grooves 21 which are open to the side faces of the belt and terminate at said side faces. The cover 18 bows outwardly into each protuberance providing a fullness of material to permit bending of the belt about small pulleys without breaking of the cover fabric while at the same time the cover fabric extends smoothly along the side driving faces providing good frictional engagement with the driving faces of pulleys.

In building the belt, the fabric layers 16, the tension resisting elements 14 and the body 15 of rubber-like material are assembled about a building drum. The cover material 18 is then laid about the surfaces of the belt and the belt is placed in a mold groove for shaping and vulcanizing it. A suitable molding drum 25 may be made up of metal rings 26 having concentric shoulders 27, 28 engaging each other between rings to center the rings. Belt-molding grooves 29 are provided between successive rings and are open at the outer periphery of the drum. For holding the rings in assembled relation at least the end rings are provided with spokes 32 connecting them to hubs 33, and a bolt 34 extends through the stack of rings engaging through the hubs, a nut 35 being provided to engage the threaded end of the bolt to clamp the rings in place.

For applying confining pressure about the drum and for forming the protuberances on the outer periphery of the belts, a sheet 36 of perforated sheet metal or other suitable sheet material is placed about the drum and is of circumferential extent substantially equal to the outer periphery of the drum. A cloth wrapping 37 is wound about the perforated sheet under tension and forces the sheet into pressed engagement with the outer faces of the belts pressing the belts into the grooves of the drum and forming the protuberances on the outer peripheries of the belts by flow of material under pressure into the perforations 38 to provide the protuberances 20. The drum with the belts and the wrapping thereon is then placed in an open steam vulcanizer where it is surrounded by steam under pressure to vulcanize the belts. The belts soften under influence of the heat provided by the steam, and the cloth wrapper is contracted thereby so that the perforated sheet is embedded in the outer periphery of the belts, the rubber material of the cover flowing into and filling the perforations 38 and the fabric layers being bulged outwardly at the perforations so as to extend into the protuberances.

Preferably the perforations in the sheet 36 are of such size as to span a mold groove so that portions of the sheet between the perforations form a groove in the peripheral surface of the belt extending entirely thereacross and the fabric cover material of the belt is formed to provide corrugations thereof for fullness of the cover at the tension side of the belt.

After vulcanization of the belts, the steam is released from the vulcanizer, the drum is removed, the wrapping and the sheet of perforated metal is removed from the drum, the drum is disassembled and the belts are removed therefrom.

In the finished belts, the cover is outwardly bulged at each protuberance 20, providing greater stretchability of the cover in the region of the outer periphery of the belt where the greatest stretchability is required. Also the protuberances in the outer face of the belt provide for better cooling of the belt in use and in cases where it is desired to use the outer face of the belt for conveying purposes, the protuberances are of advantage in providing greater traction.

Variations may be made without departing from the scope of the invention as it is defined by the following claims.

I claim:

1. The method of making an endless side-driving belt comprising placing an endless side-driving belt carcass including a body of vulcanizable rubber-like materials, tension members with said body, and a fabric cover on at least the outer peripheral face of said belt within an annular molding cavity with the outer peripheral face of said belt exposed at the mouth of said cavity, covering said exposed face of the belt with a flexible perforated metal molding sheet coextensive with the area of said exposed face, covering said molding sheet with a fabric wrapping to embed said sheet in said face of the belt and to confine said belt carcass in said molding cavity, and then heating the resulting assembly to vulcanize said belt carcass.

2. The method of making an endless belt comprising placing an endless belt carcass including vulcanizable rubber-like material within an annular molding cavity with the outer peripheral face of the belt carcass exposed at the mouth of said cavity, covering said exposed face of the belt with a flexible perforated molding sheet, covering said molding sheet with a fabric wrapping to embed said molding sheet in said face of the belt and to confine said belt carcass in said molding cavity, heating the resulting assembly to vulcanize said belt carcass, and then stripping said belt carcass from said molding cavity and said molding sheet and said fabric wrapper.

References Cited in the file of this patent

UNITED STATES PATENTS

| 1,204,976 | Hall | Nov. 14, 1916 |
| 1,510,449 | Brucker | Sept. 30, 1924 |
| 2,392,373 | Freedlander | Jan. 8, 1946 |
| 2,457,370 | Hawkinson | Dec. 28, 1948 |
| 2,621,528 | Luaces et al. | Dec. 16, 1952 |